T. W. BYRNE.
CARBON ELEMENT AND METHOD OF MAKING THE SAME.
APPLICATION FILED NOV. 2, 1918.
1,316,765. Patented Sept. 23, 1919.
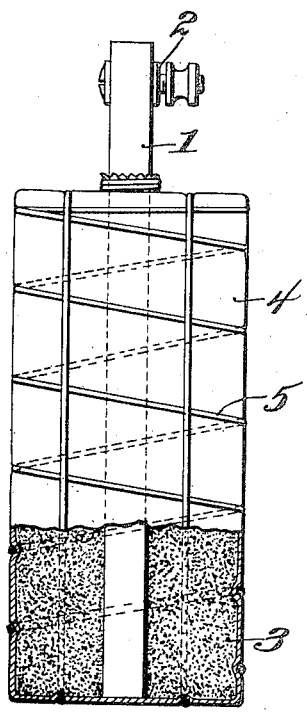

UNITED STATES PATENT OFFICE.

THOMAS W. BYRNE, OF BOSTON, MASSACHUSETTS.

CARBON ELEMENT AND METHOD OF MAKING THE SAME.

1,316,765.  Specification of Letters Patent.  Patented Sept. 23, 1919.

Application filed November 2, 1918. Serial No. 260,830.

*To all whom it may concern:*

Be it known that I, THOMAS W. BYRNE, a citizen of the United States, residing at Boston, in the county of Suffolk and State of Massachusetts, have invented certain new and useful Improvements in Carbon Elements and Methods of Making the Same; and I do hereby declare the following to be a full, clear, and exact description of the invention such as will enable others skilled in the art to which it appertains to make and use the same.

The present invention relates to dry batteries and more particularly to the carbon element for such batteries and to the method of making such element and the battery embodying the same.

Where dry batteries are completely assembled and then stand for any considerable period of time before use, a deterioration occurs due to local internal action which may very substantially shorten their life in service or even render them unfit for use altogether. In order to avoid this deterioration it has been proposed to assemble a dry battery only just before it was to be put into service. It has been found, however, that the handling and shipment of the unassembled elements is liable to result in injury to the carbon element when it consists, for example, of a stick or block of carbon surrounded by depolarizing material held in place in some suitable manner, as by a textile bag or other container. With such a carbon element the shocks and jars incident to handling and shipment are liable to loosen the depolarizing material, however tightly it may have originally been packed around the carbon block, thus impairing the electrical contact of the particles of depolarizing material with one another and with the carbon block. As a result the internal resistance of the battery when assembled is increased and its usefulness impaired and possibly destroyed altogether.

It is the object of the present invention to provide a carbon element for dry batteries which shall comprise a stick or block of carbon surrounded by depolarizing material all united together in a hard, solid mass which is capable of withstanding heavy shocks and jars without danger of being broken or loosened.

A further object of the present invention is to provide a method or process for producing the above described element and the battery embodying the same.

With these objects in view the present invention consists in the carbon element and methods of making the same and embodying such element in a battery as hereinafter described and more particularly defined in the claims.

In the accompanying drawing is shown a carbon element constructed in accordance with the present invention. This carbon element comprises the usual carbon rod or block 1 provided at its upper end with a binding post or connector 2. The carbon block, except at its upper end, is surrounded by the depolarizing material 3 or "mix" as it is commonly termed. This may be of any desired composition, a common mix consisting of granular or powdered carbonaceous and depolarizing material. A bag 4 of textile material surrounds the depolarizing material and carbon, and is held in place by means of a cord 5.

In order that the depolarizing material and carbon block may form a solid, unitary structure, the depolarizing material is moistened with a solution of crystalline electrolytic salt. This may be applied either before the depolarizing material is placed around the carbon or afterward or partly at both times. The solvent is then removed in any suitable manner, as by natural evaporation, heating, etc. As the solvent is withdrawn, the electrolytic salt crystallizes upon the carbonaceous and depolarizing material, securely binding the particles of the latter together and to the carbon to form a strong, unitary structure which may be handled and shipped without being broken or loosened.

The preferred way of assembling the carbon element is by placing the textile bag inside of a split mold of the desired contour. A small quantity of depolarizing material slightly moistened with an aqueous solution of zinc and ammonic chlorids or other suitable electrolytic salts is then placed in the bottom of the bag and tamped or rammed. The carbon stick or block is then positioned within the mold and bag and the depolarizing material slightly moistened, as above described, is gradually added, being continually tamped around the carbon. After the desired amount of depolarizing material has been placed in the mold, the top of the bag is closed and bound tightly around the carbon stick. The element is then removed from the mold and a cord wound tightly around the outside of the bag. The element is next placed in a solution of the electrolytic material, the bag and depolarizing material being submerged and left there until its interior has been sufficiently moistened with the solution. The element is then removed, allowed to drain and dry in the air for several hours, after which it is subjected to heat until it becomes dry and hard.

A carbon element constructed as above is adapted for use in the ordinary type of dry battery merely by being placed in the zinc container with a lining of blotting paper or other bibulous material. The space between the carbon element and the lining is then filled with a paste or solution of electrolytic material, the top of the container sealed with wax or pitch, and the cell is ready for use. In use the moisture from the paste or solution will penetrate the depolarizing mass and, dissolving the crystals of electrolytic salt, will furnish an additional supply of the electrolytic material.

The bag, in which the depolarizing material is packed and which affords protection to the element in handling and transportation, serves to hold the particles of depolarizing material in close contact with one another and with the carbon element after the battery has been assembled and the binding crystals of electrolytic material have become dissolved.

While in what is now considered the preferred embodiment of the present invention an aqueous solution of the electrolytic material is employed, the present invention is not necessarily limited thereto, as in its broader aspects it contemplates the use of electrolytic material in any suitable form which shall serve to bind together the particles of the depolarizing material or shall connect the depolarizing material and the carbon electrode into a solid, dry, unitary mass.

Having thus described the present invention, what is claimed is:

1. A carbon element for batteries comprising a block of carbon surrounded by dry depolarizing material united to the carbon by dry electrolytic material.

2. A carbon element for batteries comprising a block of carbon surrounded by dry pulverized material united together and to the carbon by a crystallized electrolytic salt.

3. The method of making carbon elements for batteries which consists in surrounding a block of carbon with pulverized depolarizing material moistened with a solution of electrolytic salt, and removing the solvent to cause the salt to crystallize and bind the depolarizing material and carbon into a unitary mass.

4. The method of making carbon elements for batteries which consists in surrounding the carbon block with ununited particles of depolarizing material and thereafter uniting the depolarizing material into a solid, unitary mass with dry electrolytic material.

5. The method of making carbon elements for batteries which consists in surrounding the carbon block with pulverized depolarizing material, inclosing the carbon block and depolarizing material in a tightly fitting pervious insulating container, and uniting the depolarizing material and carbon block into a unitary mass with soluble material.

6. The method of making carbon elements for batteries which consists in surrounding the carbon block with pulverized depolarizing material mixed with electrolytic material, and heating the carbon and depolarizing material to cause the electrolytic material to bind the depolarizing material and carbon into a solid, unitary mass.

7. The method of making batteries which consists in placing within a zinc container a carbon element comprising a block of carbon and depolarizing material united to form a solid mass by means of soluble electrolytic material and contained within a pervious insulating covering, and supplying moisture to the container to dissolve the uniting electrolytic material.

THOS. W. BYRNE.